Figure 1:
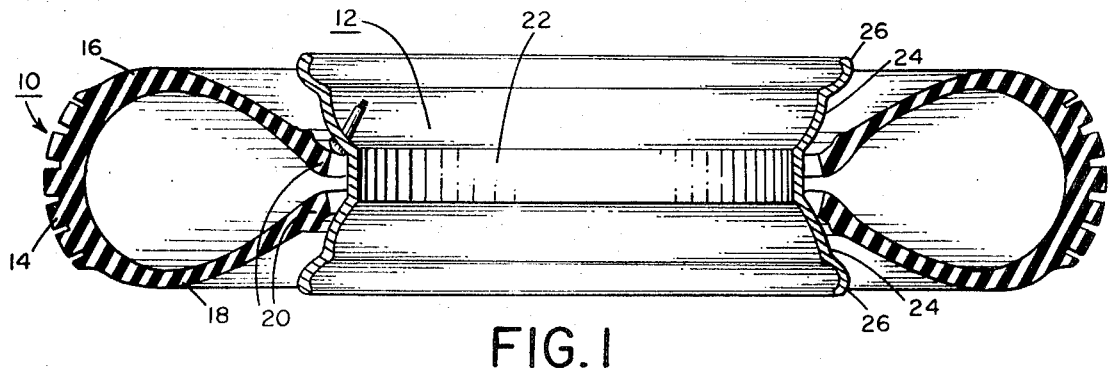

United States Patent

Kaminskas

[15] 3,651,849
[45] Mar. 28, 1972

[54] BEAD EXPANDER FOR MOUNTING AND INFLATING TUBELESS TIRES
[72] Inventor: Anthony F. Kaminskas, Lyndhurst, Ohio
[73] Assignee: Clevite Corporation
[22] Filed: Jan. 23, 1970
[21] Appl. No.: 5,298

[52] U.S. Cl. ............................................................157/1.1
[51] Int. Cl. .....................................................B60c 25/12
[58] Field of Search....................................................157/1.1

[56] References Cited

UNITED STATES PATENTS 2,874,759  2/1959  Ranallo..................................157/1.1
3,552,469  1/1971  Corless...................................157/1.1

Primary Examiner—Granville Y. Custer, Jr.
Attorney—Edward E. Sachs

[57] ABSTRACT

A device for mounting and inflating a tubeless tire on an automotive wheel rim. An inflatable annular member of tubular cross section is placed between the flanged rim of the wheel and the sidewall of the tire to establish a sealed air chamber after the annular member has been inflated. Upon initial inflating of the tire, the annular member rolls off from between the rim and the sidewall.

3 Claims, 5 Drawing Figures

PATENTED MAR 28 1972

3,651,849

*INVENTOR.*
ANTHONY F. KAMINSKAS
BY Edward E. Sachs

ATTORNEY 3,651,849

BEAD EXPANDER FOR MOUNTING AND INFLATING TUBELESS TIRES

The present invention relates generally to an automotive tire installation device and, more particularly, to an improvement for mounting and inflating a tubeless tire on a wheel rim.

The present application is related to U.S. application, Ser. No. 5208, concurrently filed herewith, which constitutes an improvement of my present invention when the invention is to be employed in connection with inflating certain tires.

In the prior art, numerous devices have been known for aiding in the installation of tires on wheel rims. Such assistance is necessary as the sidewalls of the tire are usually collapsed and a seal cannot be readily established between the rim flange and the tire bead seat to permit air pressure to inflate the tire. In the past, an inflating device has already been successfully utilized. This device is secured on the circumference of the tire tread, usually proximate to the center thereof. The device comprises a tube which is inflated to constrict and reduce the diameter of the tire tread portion to cause a lateral movement of the sidewalls for pressing the tire bead tightly against the flanged portion of the rim. It has been found that these and similar devices cannot be readily utilized for mounting radial ply and belted tubeless tires. Numerous attempts have been made to overcome this difficulty and most of these attempts have failed for either economical or operational reasons.

In many of such new designs, rigid (metal) sleeves of a tubular nature are utilized. One end of the sleeve is placed tightly around the rim, while the other end extends axially outward. The rim engaging end bears against the sidewall of the tire in order to create a sealed area between the rim diameter and the sidewall. Such devices have exhibited, as already noted above, many shortcomings, for instance, in that they are unable to readily establish a seal-tight chamber and, when handled rather roughly by the installer, can be injurious to the latter.

It is therefore the primary object of this invention to provide an improved tire mounting and inflating device which obviates the disadvantages of the prior art and which provides an economical means for installing a radial ply tubeless tire in a safe and efficient manner.

The present invention is derived from and is based upon the basic idea of utilizing an annular elastomeric member and interposing such member between the rim of the automotive wheel and the sidewall of the tire to establish a sealed air chamber therebetween. This approach obviates the need for various accessories and aids as commonly used in the prior art for holding down and keeping in place the bead expander. The bead expander will automatically release itself from its operating position although at times it will be desirable or necessary to lubricate the annular member to facilitate such release.

One aspect of the present invention resides in the provision of a device for mounting and inflating a tubeless tire on a tire wheel rim in which the wheel rim is provided with a continuous flange at its axial periphery. The bead expander comprises an annular member of elastomeric material for placement between the rim and the sidewall of the tire with the member being effective to establish in situ a sealed air chamber between the rim and the sidewall in response to initial inflating of the tire. The annular member has an inner diameter approximating the outside diameter of the flange portion of the rim. Further, the annular member is essentially tubular in cross-section.

For a better understanding of the present invention, together with other and further objects thereof, reference is had to the following description taken in connection with the accompanying drawings, and its scope will be pointed out in the appended claims.

In the drawing:

FIG. 1 is a sectional view of a conventional uninflated tubeless tire mounted and supported on a rim; and FIGS. 2 to 5 are fragmentary views in section, similar to the view shown in FIG. 1, showing the present invention in various stages of assisting the mounting and inflating of the tire.

Referring now to the drawing, there is shown in FIG. 1 a typical tubeless tire 10 mounted on a drop center wheel rim 12. The tire comprises a circumferentially arranged tread 14 with adjacent sidewalls 16, 18 having at their outer ends a tire bead portion 20. The wheel rim 12 is also of conventional configuration and includes a drop center well portion 22 and complementary tire bead portions 24 and a circumferentially continuous flange 26 at each axial end of the flange.

The tire 10 is mounted upon the wheel rim 12 in the conventional manner until the same is positioned with both sidewalls 16, 18 proximate to the drop center well portion 22 substantially as shown in FIG. 1. This is normally accomplished with the assistance of a hand tool, such as a bar, or the like.

In accordance with the present invention an annular member 28 of elastomeric material is placed between a sidewall, e.g., 16 or 18 and the flanged portion 26 of the wheel rim 12. The annular member 28 is of ring-like configuration and has an inner diameter substantially approximating the outside diameter of the rim flange 26. The annular member, or bead expander 28, is formed as a hollow tube provided with an air inflating valve 40.

Figure 2:
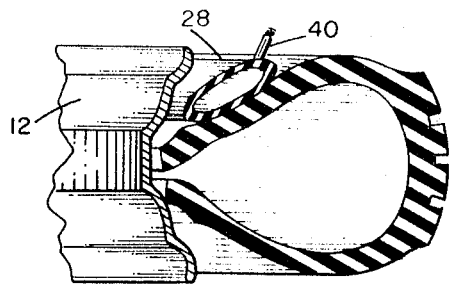

In order to facilitate the proper seating of the annular member 28 the same is initially placed between the rim and the sidewall, which define a gap, in deflated condition and thereafter inflated so that the bead expander 28 will assume a position substantially as shown in FIG. 2 with the contacting surfaces of the annular member 28 being within the gap. This position is effective to establish a sealed air chamber between the rim 12 and the sidewall 16 of the tire. The tire is then inflated in the conventional manner causing the annular member 28 to roll on its rolling surface 34 while maintaining sealing contact between the rim 12 and the flange 26 whereby air is prevented from escaping the now sealed chamber 36. The sealed chamber 36 is established and maintained due to the pressure exerted upon the rolling contact surface 34 by the expanding sidewall 16.

Figure 3:
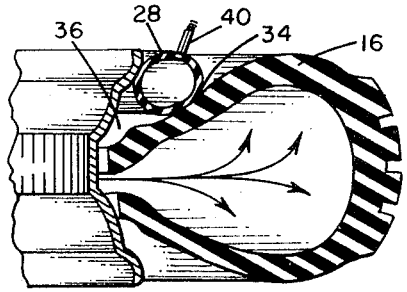

In order to facilitate the "rolling effect" of the annular member, the annular member is coated with a lubricant in those areas which are designated herein by reference numeral 34, see FIG. 3.

Figure 4:
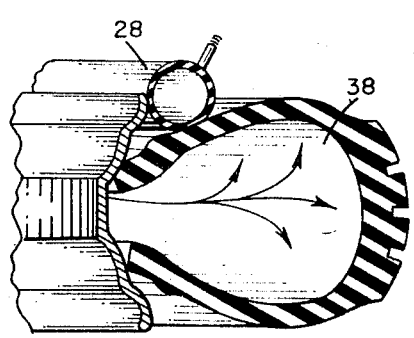

FIG. 4 illustrates that despite the fluid intercourse between the chambers 36 and 38, the tire sidewalls expand due to increased internal pressure whereby the rolling effect upon the annular member 28 is increased causing the annular member to roll off the sidewall 16 and thereby being released from the holding engagement with flange 26. At this point, the tire bead portion 20 comes to rest against the rim bead, see 24, and abuts the flange 26 of the rim 12 effecting a complete seating of the tire.

Figure 5:
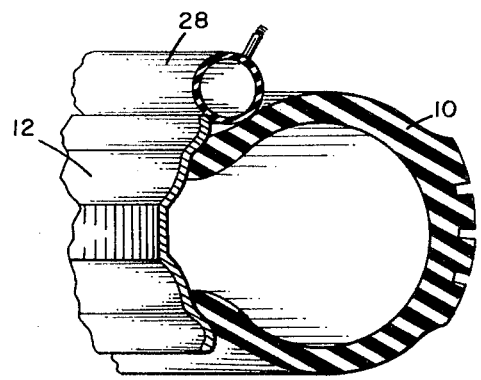

FIG. 5 shows the position of the tire beads 20 and that of the annular member 28 after inflating has been completed.

At times it will be necessary to manually hold the tubular, annular member 28 in place against the tire pressure to maintain the proper seating relationship and to prevent premature rolling off as described above. This problem does not occur with respect to all tires. However, I have discovered, together with a co-inventor, a means for preventing such premature roll-off. That invention is described in the above noted concurrently filed patent application.

In accordance with my above described invention, it is not necessary that the tubular annular member 28 be provided with an inflating valve 40. A permanently pressurized tube may be used in lieu of an inflatable tubular member 28.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. Device for mounting and inflating a tubeless tire on a tire wheel rim, in which the rim is provided with a continuous flange at its axial ends, comprising:
a substantially air impervious annular member of elastomeric material for rollable interposition between the rim and the sidewall of the tire with the contacting surfaces of said annular member being within the gap established by the wheel rim and said sidewall, said annular member being effective to establish a sealed air chamber between the rim and the sidewall in response to initial inflating of the tire, said annular member having an inner diameter substantially approximating the outside diameter of the flanges portion of the rim and a substantially uniform, circular cross section;
and whereby upon further inflating of the tire the annular member is effective to roll off from and between the rim and the sidewall.

2. A device according to claim 1, when said member of circular cross-section is hollow.

3. A device according to claim 2, and pneumatic valve means on said annular member for inflating and deflating the latter.

* * * * *